US011902533B2

United States Patent
Wu et al.

(10) Patent No.: US 11,902,533 B2
(45) Date of Patent: Feb. 13, 2024

(54) CODE RATE CONTROL METHOD AND APPARATUS, IMAGE ACQUISITION DEVICE, AND READABLE STORAGE MEDIUM

(71) Applicant: ZHEJIANG UNIVIEW TECHNOLOGIES CO., LTD., Hangzhou (CN)

(72) Inventors: Hui Wu, Hangzhou (CN); Kesen Yan, Hangzhou (CN); Qiong Xu, Hangzhou (CN)

(73) Assignee: ZHEJIANG UNIVIEW TECHNOLOGIES CO., LTD., Hangzhou (CN)

( * ) Notice: Subject to any disclaimer, the term of this patent is extended or adjusted under 35 U.S.C. 154(b) by 999 days.

(21) Appl. No.: 16/645,211

(22) PCT Filed: Aug. 9, 2018

(86) PCT No.: PCT/CN2018/099665
§ 371 (c)(1),
(2) Date: Jun. 9, 2020

(87) PCT Pub. No.: WO2019/047664
PCT Pub. Date: Mar. 14, 2019

(65) Prior Publication Data
US 2023/0232014 A1    Jul. 20, 2023

(30) Foreign Application Priority Data
Sep. 6, 2017    (CN) .......................... 201710797249.3

(51) Int. Cl.
*H04N 19/147*    (2014.01)
*H04N 19/105*    (2014.01)
(Continued)

(52) U.S. Cl.
CPC ......... *H04N 19/147* (2014.11); *H04N 17/002* (2013.01); *H04N 19/105* (2014.11);
(Continued)

(58) Field of Classification Search
CPC .. H04N 19/147; H04N 17/002; H04N 19/105; H04N 19/137; H04N 19/159; H04N 19/167; H04N 19/176; H04N 7/183
See application file for complete search history.

(56) References Cited

U.S. PATENT DOCUMENTS

2007/0013794 A1 *   1/2007   Tsuruoka .............. H04N 25/134
                                                    348/241
2007/0040919 A1 *   2/2007   Tsuruoka .............. H04N 25/683
                                                    348/E5.079
(Continued)

FOREIGN PATENT DOCUMENTS

CN    101247525 A    8/2008
CN    101778281 A    7/2010
(Continued)

OTHER PUBLICATIONS

International Search Report for PCT/CN2018/099665 dated Nov. 2, 2018.
(Continued)

*Primary Examiner* — John R Schnurr
(74) *Attorney, Agent, or Firm* — Dinsmore & Shohl LLP (57) ABSTRACT

A code rate control method and apparatus, an image acquisition device, and a readable storage medium are provided. The method includes: acquiring the gain and exposure time of an image to be encoded from an image processing module of an image acquisition device; obtaining corresponding reference distortion degree according to the gain and exposure time of said image; calculating the difference between the distortion degree in a characteristic region of said image
(Continued)

and the reference distortion degree; calculating a distortion tolerance degree of macro blocks constituting said image according to the difference between the distortion degree in the characteristic region of said image and the reference distortion degree; performing macro block predictions on the respective macro blocks in said image, to obtain an optimum macro block prediction mode; and encoding said image, which corresponds to the optimum macro block prediction mode.

20 Claims, 4 Drawing Sheets

(51) Int. Cl.
  *H04N 19/137* (2014.01)
  *H04N 19/159* (2014.01)
  *H04N 19/167* (2014.01)
  *H04N 19/176* (2014.01)
  *H04N 17/00* (2006.01)
  *H04N 7/18* (2006.01)

(52) U.S. Cl.
  CPC ......... *H04N 19/137* (2014.11); *H04N 19/159* (2014.11); *H04N 19/167* (2014.11); *H04N 19/176* (2014.11); *H04N 7/183* (2013.01)

(56) References Cited

U.S. PATENT DOCUMENTS

| | | | | |
|---|---|---|---|---|
| 2008/0204577 | A1* | 8/2008 | Tsuruoka | G06T 5/002 348/E5.079 |
| 2009/0219417 | A1* | 9/2009 | Tsuruoka | G06T 5/002 348/241 |
| 2010/0026859 | A1* | 2/2010 | Tsuruoka | H04N 25/60 348/241 |
| 2010/0225790 | A1* | 9/2010 | Sasaki | G06T 5/20 348/241 |
| 2011/0102647 | A1* | 5/2011 | Kim | H04N 25/63 348/243 |
| 2011/0116720 | A1 | 5/2011 | Gwak et al. | |
| 2015/0016510 | A1 | 1/2015 | Carlsson et al. | |
| 2018/0091773 | A1* | 3/2018 | Moussa | G06T 1/20 |

FOREIGN PATENT DOCUMENTS

| | | |
|---|---|---|
| CN | 102724525 A | 10/2012 |
| CN | 104065962 A | 9/2014 |
| WO | 2006070046 A1 | 7/2006 |
| WO | 2010021664 A1 | 2/2010 |

OTHER PUBLICATIONS

International Written Opinion for PCT/CN2018/099665 dated Nov. 2, 2018.
First Office Action for CN2017107972493 issued by The State Intellectual Property Office of People's Republic of China dated Mar. 9, 2019.
European Patent Office Action for EP Application No. 18852825.1 dated Jul. 31, 2020.
Hui et al. "An improved algorithm of H. 264 intra prediction mode selectoin" Journal of Zhejiang University of Technology, vol. 42, No. 2, Apr. 2014, 6 pgs.
First Search Report for CN Application No. 2017107972493.
Cohen et al., "Joint Perceptually-based Intra Prediction and Quantization for HEVC; Mitsubishi Electric Research Laboratories", http://wwww.merl.com; Dec. 2012, 12 pgs.
European Patent Office Action for EP Application No. 18852825.1 dated Aug. 12, 2020.
European Patent Office Action for EP Application No. 18852825.1 dated Apr. 14, 2021.
Li et al., "Region-of-interest based rate control algorithm for H.264/AVC video coding", Springer Science+Business Media New York 2015, 24 pgs.
Changcai et al. "An Efficient Prediction Mode Decision Algorithm for H. 264 Video Coding Using Fuzzy Integral, Jorunal of Northwestern Polytechnical University", vol. 23 No. Dec. 6, 2005.

* cited by examiner

CODE RATE CONTROL METHOD AND APPARATUS, IMAGE ACQUISITION DEVICE, AND READABLE STORAGE MEDIUM

CROSS-REFERENCE TO RELATED APPLICATIONS

This application is a U.S. National Phase entry of International Patent Application No. PCT/CN2018/099665 filed Aug. 8, 2018, which claims priority of Chinese Patent Application No. 201710797249.3, filed with the Chinese Patent Office on Sep. 6, 2017, entitled "Code Rate Control Method and Apparatus, Image Acquisition Device, and Readable Storage Medium", the contents of which are incorporated herein by reference in their entirety.

TECHNICAL FIELD

The present disclosure relates to the field of surveillance (or monitoring), and in particular to a method and an apparatus for controlling a bit rate (code rate) of a surveillance video, an image acquisition device, and a readable storage medium.

BACKGROUND ART

There have been tremendous changes in the field of surveillance in recent years. The sharpness (or definition) of images has been improved comprehensively with digitization and high-definition technologies, which also puts forward higher requirements on the network bandwidth. Now the prevailing 1080P format has gradually been replaced by formats of 5M, 8M or even 12M resolutions, which consequently brings the problem of insufficient bandwidth. With limited bandwidth, we should put effort into video encoding to create higher-quality pictures. In the prior art, there are solutions relating to controlling a bit rate by image texture complexity, for example, a solution in which controlling the bit rate is controlled using a high quality factor for high-complexity texture. However, in the above solution, an image is evaluated based on the image texture complexity which is an objective condition. For image regions having the same complexity, such as a grassland and a flowerbed, the bit rate is controlled in the same manner, whereas the subjective perception from the human eyes are ignored. Although the bit rate of the encoded picture is controlled, the image provides poor subjective representation, which can hardly meet user's expectations and affects the user experience.

SUMMARY

In order to overcome the above-mentioned shortcomings in the prior art, an object of the present disclosure is to provide a bit rate control method and apparatus, an image acquisition device, and a readable storage medium. The bit rate control method enables control of a bit rate during image encoding, while enabling the encoded image to provide a good subjective representation as well.

Regarding the bit rate control method, an embodiment of the present disclosure provides a bit rate control method, which is applicable to an image acquisition device in which correspondence relations between reference distortion degrees and different gains as well as different exposure time of the image acquisition device are pre-stored, and the method including the steps of:

acquiring a gain and an exposure time of an image to be encoded;

obtaining a corresponding reference distortion degree according to the gain and the exposure time of the image to be encoded;

calculating a difference between the reference distortion degree and a distortion degree of a feature region in the image to be encoded;

calculating a distortion tolerance of each macroblock constituting the image to be encoded according to the difference between the reference distortion degree and the distortion degree of the feature region in the image to be encoded;

performing macroblock prediction on each macroblock in the image to be encoded based on the distortion tolerance of each macroblock constituting the image to be encoded to obtain an optimal macroblock prediction mode; and encoding the image to be encoded corresponding to the optimal macroblock prediction mode to complete a bit rate control of the image to be encoded.

Regarding the bit rate control apparatus, an embodiment of the present disclosure provides a bit rate control apparatus, which is applicable to an image acquisition device in which correspondence relations between reference distortion degrees and different gains as well as different exposure times of the image acquisition device are pre-stored, the apparatus includes:

an acquisition module configured to acquire a gain and an exposure time of an image to be encoded;

an obtaining module configured to obtain a corresponding reference distortion degree according to the gain and the exposure time of the image to be encoded;

a calculation module configured to calculate a difference between the reference distortion degree and a distortion degree of a feature region in the image to be encoded;

wherein the calculation module is further configured to calculate a distortion tolerance of each macroblock constituting the image to be encoded according to the difference between the reference distortion degree and the distortion degree of the feature region in the image to be encoded;

a prediction module configured to perform prediction on each macroblock in the image to be encoded based on the distortion tolerance of each macroblock constituting the image to be encoded to obtain an optimal macroblock prediction mode; and an encoding module configured to encode the image to be encoded corresponding to the optimal macroblock prediction mode to complete a bit rate control of the image to be encoded.

Regarding the image acquisition device, an embodiment of the present disclosure provides an image acquisition device having a processor and a non-volatile memory storing a number of computer instructions, wherein the image acquisition device is configured to execute the bit rate control method described above when the computer instructions are executed by the processor.

Regarding the readable storage medium, the readable storage medium includes a computer program, wherein the computer program, when running, controls an electronic device where the readable storage medium is located to execute the bit rate control method described above.

The bit rate control method and apparatus, the image acquisition device, and the readable storage medium according to the embodiments of the present disclosure include the following advantageous effects:

The embodiments of the present disclosure provide a bit rate control method and apparatus, an image acquisition device, and a readable storage medium, wherein the method includes: acquiring a gain and an exposure time of an image to be encoded by an image processing module of the image acquisition device; obtaining a corresponding reference distortion degree according to the gain and the exposure time of the image to be encoded; calculating a difference between the reference distortion degree and a distortion degree of a feature region in the image to be encoded, the feature region including a region of interest, a motion region, a complexity region, and an excessively bright or dark region; calculating a distortion tolerance of each macroblock constituting the image to be encoded according to the reference distortion degree and the difference between the distortion degree of the feature region in the image to be encoded; performing prediction on each macroblock in the image to be encoded to obtain an optimal macroblock prediction mode; encoding the image to be encoded corresponding to the optimal macroblock prediction mode to complete a bit rate control of the image to be encoded. The method can achieve bit rate control by the cooperation of image processing and encoding while ensuring that the encoded image provides a good subjective representation.

In order to provide a clearer and easier understanding of the above aspects, features, and advantages of the present disclosure, embodiments of the present disclosure will be described in detail below by way of example with reference to the accompanying drawings.

BRIEF DESCRIPTION OF DRAWINGS

In order to more clearly illustrate technical solutions of embodiments of the present disclosure, drawings required for use in the embodiments will be described briefly below. It is to be understood that the drawings below are merely illustrative of some embodiments of the present disclosure, and therefore should not be construed as limitations on its scope. It will be understood by those of ordinary skill in the art that other relevant drawings can also be obtained from these drawings without any inventive effort.

DETAILED DESCRIPTION OF EMBODIMENTS

In order to further clarify the objects, technical solutions, and advantages of the embodiments of the present disclosure, the technical solutions of the embodiments of the present disclosure will be described below clearly and completely with reference to the drawings of the embodiments of the present disclosure. It is apparent that the embodiments to be described are some, but not all of the embodiments of the present disclosure. Generally, the components of the embodiments of the present disclosure, as described and illustrated in the figures herein, may be arranged and designed in a wide variety of different configurations.

Thus, the following detailed description of the embodiments of the present disclosure, as represented in the figures, is not intended to limit the scope of the present disclosure as claimed, but is merely representative of selected embodiments of the present disclosure. All other embodiments obtained by those of ordinary skill in the art in light of the embodiments of the present disclosure without inventive efforts should fall within the scope of the present disclosure as claimed.

It should be noted that like reference numerals and letters refer to like items in the following figures, and thus once an item is defined in one figure, it may not be further defined or explained in the following figures.

Some embodiments of the present disclosure will be described in detail below with reference to the accompanying drawings. The following embodiments and features in the embodiments may be combined with each other without conflict.

Figure 1:
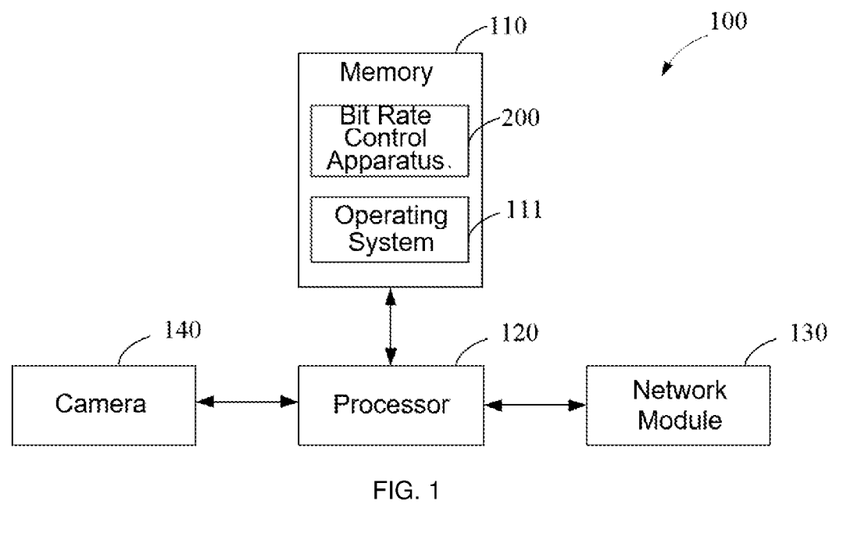
FIG. 1 is a schematic block diagram of an image acquisition device according to an embodiment of the present disclosure.

Referring to FIG. 1, FIG. 1 is a schematic block diagram of an image acquisition device 100 according to an embodiment of the present disclosure. The image acquisition device 100 in the embodiment of the present disclosure may be configured to control an encoding bit rate of a captured image. As shown in FIG. 1, the image acquisition device 100 includes: a memory 110, a processor 120, a network module 130, and a camera 140.

The memory 110, the processor 120, the network module 130, and the camera 140 are directly or indirectly electrically connected with one another to implement data transmission or interaction. For example, these elements may be electrically connected with one another via one or more communication buses or signal lines. A bit rate control apparatus (or unit) 200 is stored in the memory 110. The bit rate control apparatus 200 includes at least one software functional module that can be stored in the form of software or firmware in the memory 110. The processor 120 runs software programs and modules stored in the memory 110, such as the bit rate control apparatus 200 in the embodiment of the present disclosure, so as to execute various functional applications and data processing, i.e., implement an image processing method in the embodiment of the present disclosure.

Here, the memory 110 may be, but is not limited to, a random access memory (RAM), a read only memory (ROM), a programmable read-only memory (PROM), an erasable programmable read-only memory (EPROM), an electric erasable programmable read-only memory (EEPROM), or the like. Here, the memory 110 is configured to store a program, and the processor 120 is configured to execute the program after receiving an execution instruction. Further, the software programs and modules in the memory 110 may further include an operating system 111. It may include various software components and/or drivers for managing system tasks (such as memory management, storage device control, power management, etc.) and may communicate with various hardware or software components to provide an environment for running of other software components.

The processor 120 may be an integrated circuit chip having a signal processing capability. The processor 120 may be a general-purpose processor, including a central processing unit (CPU), a network processor (NP), and the like. It may also be a digital signal processor (DSP), an application specific integrated circuit (ASIC), a field programmable gate array (FPGA) or other programmable logic device, a discrete gate or transistor logic device, or a discrete hardware component. Various methods, steps, and logical block diagrams disclosed in the embodiments of the present disclosure may be implemented or executed. The general-purpose processor may be a microprocessor, or the processor may be any conventional processor or the like.

The network module 130 is configured to establish a communication connection between the image acquisition device 100 and a video surveillance center via a network to implement operations of receiving and transmitting network signals and data. The network signals may include wireless signals and/or wired signals.

The camera 140 is configured to capture video or image information from an area under surveillance.

It can be understood that the structure shown in FIG. 1 is merely schematic, and the image acquisition device 100 may further include more or fewer components than those shown in FIG. 1, or have a different configuration from that shown in FIG. 1. Each component shown in FIG. 1 may be implemented by hardware, software, or a combination thereof.

First Embodiment

Figure 2:
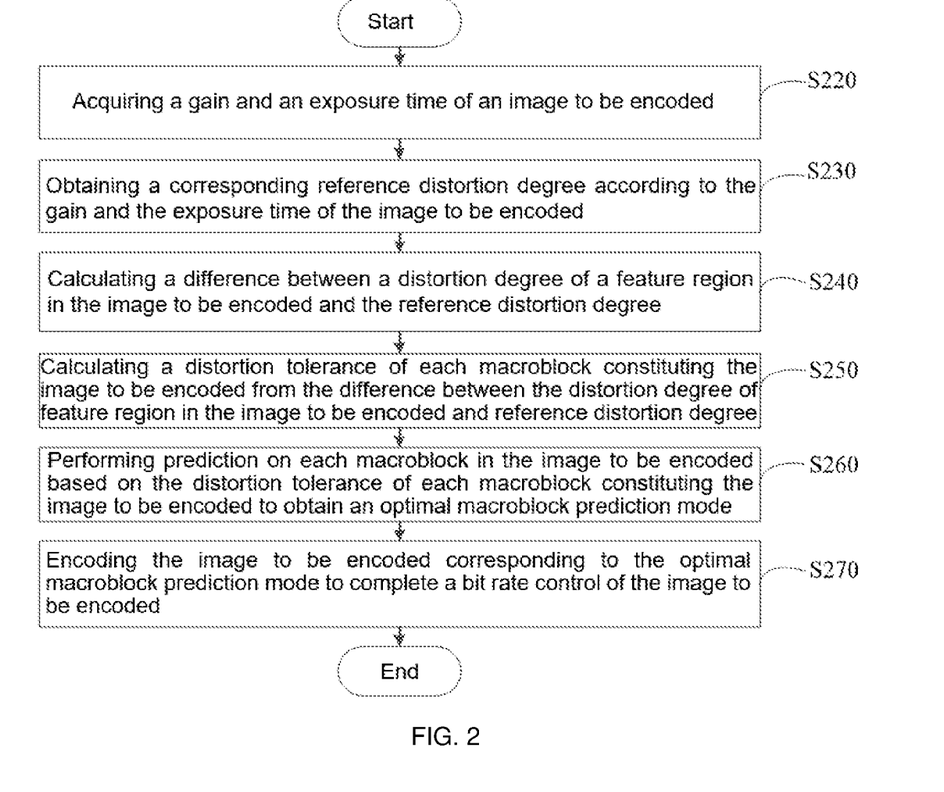
FIG. 2 is a schematic flowchart of a bit rate control method according to a first embodiment of the present disclosure.

Refer to FIG. 2, which is a schematic flowchart of a bit rate control method according to the first embodiment of the present disclosure. In the embodiment of the present disclosure, the bit rate control method is applicable to an image acquisition device 100, wherein correspondence relations between reference distortion degrees and different gains as well as different exposure times of the image acquisition device 100 are pre-stored in the image acquisition device 100, and the correspondence relations between them may be stored in the form of a table in the memory 110 of the image acquisition device 100, or may be stored in other forms in the memory 110 of the image acquisition device 100. The specific procedures and steps of the bit rate control method shown in FIG. 2 are described in detail below.

In this embodiment, the bit rate control method may include the following steps:

Step S220: acquiring a gain and an exposure time of an image to be encoded.

In this embodiment, the image acquisition device 100 acquires information on an image to be encoded using an image signal processing (ISP) module, wherein the acquired information includes the gain and the exposure time.

Step S230: obtaining a corresponding reference distortion degree is obtained according to the gain and the exposure time of the image to be encoded.

The image acquisition device 100 obtains by matching, according to the obtained gain and exposure time of the image to be encoded, a reference distortion degree corresponding to the image to be encoded from the pre-stored correspondence relations between reference distortion degrees and different gains as well as different exposure times of the image acquisition device 100. Here, the reference distortion degree is the basic distortion of an image corresponding to a case where the naked eyes can perceive the image's distortion under a specific environment, and the reference distortion degree is a subjective perceptual parameter. Different reference distortion degrees correspond to different image acquisition devices 100, different gains, and different exposure times.

Step S240: calculating a difference between a distortion degree of a feature region in the image to be encoded and the reference distortion degree is calculated.

In general, an image to be encoded is composed of some specific feature (characteristic) regions, and these feature regions are often regions about which users are more concerned. In this embodiment, the feature regions may include: one or a combination of several of a region of interest, a motion region, a complexity region, and excessively bright and excessively dark regions, and may, of course, also include other regions that can characterize the image.

The region of interest refers to a region to which more attention is paid during the surveillance. The determination of the region of interest may be achieved by using a Region of Interest (ROI) detection technology.

The ROI detection technology is generally divided into two methods, one of which is a manual method, and the other of which is a method of automatically detecting a ROI from an image using a computer. The manual detection method is not described in detail here.

In most of the automatic ROI extraction methods, firstly some key points of an image are extracted as points of interest, and a neighborhood (region) which has an appropriate size and in which the points of interest are located is used as the ROI. There are three types of automatic ROI extraction methods: (1) ROI detection based on corners, (2) ROI detection based on changes in gray level, and (3) ROI detection based on visual attention.

In the ROI detection technology based on corners. Corners are an important part of an image because the outline of an object in the image can be well sketched based on the corners. A corner detector may be used for extracting the corners as the points of interest. For example, a Harris corner detector may be used for extracting the points of interest. The Harris corner detector is an improvement on a Moravec corner detector. The Moravec corner detector is proposed by H. P. Moravec, and its basic idea is to determine a corner by a local change in gray level of an image. The corner detector has the disadvantage that the points of interest extracted by the corner detector are concentrated in a textural region and the points of interest are distributed sparsely in a region with less texture because the corners are concentrated in the textural region. Such excessively uneven distribution is not conducive to a complete description of the content of each part of the image.

In the method of ROI detection based on a change in gray level, a portion of an image with a large change in gray level is an important part of the image. In order to overcome the disadvantages of the corner detector, non-standard Haar wavelet and Daubechies 4 wavelet transforms are used for selecting points with large wavelet coefficients (absolute values) as points of interest because a large absolute value of a wavelet coefficient on a large scale indicates a large change in gray level in the corresponding image region, and these points are called significant points (or points of significance). The points of interest extracted in such way are points having a large change in gray level in the image and will not be concentrated in the textural region. However, a certain gap still exists between the ROI extracted by the change in gray level and human's observation results. This is because the process of observation of an image by a person is a process of fusion of multiple features. A selected fixation point is a region that easily attracts attention in many aspects such as color, texture, and shape. Therefore, the impact of multiple features on human attention should be taken into consideration in ROI detection.

In the method of ROI detection based on visual attention of human eyes, a good ROI detection result should be consistent with human cognition since a person is the ultimate recipient of image information. Ideally, the user's evaluation should be taken as the standard, but different users will choose different regions as the ROI for the same image depending on the users' tasks and background knowledge. Cognitive psychologists have proposed many mathematical models of visual attention to simulate the process of transformation of fixation points of humans. These models may be mainly divided into two major categories: bottom-up models and top-down models.

The bottom-up attention model is driven by data, in which the effects of specific cognitive tasks on attention and eye movements are not taken into consideration. The more representative bottom-up attention models include the Saliency Map model and the Iconic Representation model. In the saliency-based attention calculation model, firstly some low-level visual features of an image are fused to generate a saliency map, and then attention points in the image are found in order of decreasing saliency by using a dynamic neural network.

The basic idea of the saliency map method is to define the contrast between a pixel point and the background in terms of color, brightness, direction, and the like as the saliency of the point. The stronger the contrast is, the greater saliency the point has. The saliencies of all points form a saliency map. Here, the saliency map is a two-dimensional image showing the saliency of each point of the image, wherein there is a topological correspondence relation between the points in the saliency map and the pixels of the input image. The Gaussian differential function is used as a filter to filter the points of the image in k dimensions in m directions, and the filter response constitutes an m×k-dimensional feature vector. This feature vector may be called an iconic representation of pixels. This is because this vector relatively completely generalizes the features of the pixels and provides sufficient description for distinguishing different points in the image, hence the fixation point can be selected based on this vector. Another advantage of such vector is that it is calculated fast and does not vary with the transformations such as translation and rotation of the input image.

The top-down attention model is dominated by consciousness and dependent on a task. Top-down ROI detection may be usually implemented after the bottom-up ROI detection process is correspondingly adjusted under the guidance of a ROI model obtained by a specific task. The objects guided and adjusted by the ROI model may be the dimension, orientation, size, and shape of a candidate region, or may be the number, type, and description form of salient features, or may be a threshold value and integrated parameters or the like in the ROI selection and transfer process. The ROI model is usually established by using two methods. In one method, the ROI model is manually established based on a detection task. In the other method, the ROI model is automatically established based on a task example or sample.

The detection of the region of interest may be implemented by the above-mentioned methods, and evidently the region of interest may be determined by other detection techniques. The method of detecting the region of interest is not limited in the embodiments of the present disclosure.

After the region of interest in the image to be encoded is determined, the difference between the distortion degree of the region of interest and the reference distortion degree may be determined using the following formula:

$$Diffa = \begin{cases} Diffa_{min} & (a \leq a_{min}) \\ Diffa_{min} + (Diffa_{max} - Diffa_{min}) * \frac{a}{a_{min}} & (a_{min} < a \leq a_{max}) \\ Diffa_{max} & (a > a_{max}) \end{cases}$$

where Diffa is the difference between the distortion degree in the region of interest and the reference distortion degree, $Diffa_{min}$ is the preset minimum distortion degree of the region of interest, $Diffa_{max}$ is the preset maximum distortion degree of the region of interest, a is the proportion of the region of interest in the picture, $a_{min}$ is the preset lowest proportion the region of interest in the picture, and $a_{max}$ is the preset highest proportion of the region of interest in the picture.

The motion region refers to a dynamically changing region in the image to be encoded. The motion region may be obtained by using a surveillance image motion detection technology.

The difference between the distortion degree of the motion region and the reference distortion degree may be determined using the following formula:

$$Diffb = \begin{cases} Diffb_{min} & (b \leq b_{min}) \\ Diffb_{min} + (Diffb_{max} - Diffb_{min}) * \frac{b}{b_{min}} & (b_{min} < b \leq b_{max}) \\ Diffb_{max} & (b > b_{max}) \end{cases}$$

where Diffb is the difference between the distortion degree in the motion region and the reference distortion degree, $Diffb_{min}$ is the preset minimum distortion degree of the motion region, $Diffb_{max}$ is the preset maximum distortion degree of the motion region, b is the proportion of the motion region in the picture, $b_{min}$ is the preset lowest proportion of the motion region in the picture, and $b_{max}$ is the preset highest proportion of the motion region in the picture.

The complexity is used for evaluating the complexity of a picture. Specifically, a value of the sharpness of the image to be encoded may be evaluated by the image acquisition device 100. The complexity of an image may be calculated by calculating the standard deviation of each pixel in the image to be encoded, or the complexity of the image may be measured using the two-dimensional complexity based on the global Fourier transform. Optionally, the complexity of the image may be measured directly using the data on the object in the image, that is, the number of edges. An image complexity algorithm based on a visual saliency map may also be used. The specific method for determining the complexity of an image is not limited in the embodiments of the present application.

The difference between the distortion degree of the complexity region and the reference distortion degree may be determined using the following formula:

$$Diffc = \begin{cases} Diffc_{min} & (c \leq c_{min}) \\ Diffc_{min} + (Diffc_{max} - Diffc_{min}) * \frac{c}{c_{min}} & (c_{min} < c \leq c_{max}) \\ Diffc_{max} & (c > c_{max}) \end{cases}$$

where Diffc is the difference between the distortion degree in the complexity region and the reference distortion degree, $Diffc_{min}$ is the preset minimum distortion degree of the complexity region, $Diffc_{max}$ is the preset maximum distortion degree of the complexity region, c is the proportion of the complexity region in the image to be encoded, $c_{min}$ is the preset lowest proportion of the complexity region, and $c_{max}$ is the preset highest proportion of the complexity region.

The difference between the distortion degree of the excessively bright or excessively dark region and the reference distortion degree may be determined using the following formula:

$$Diffd = \begin{cases} d_1 (d \leq d_{min}) \\ 0 (d_{min} < d \leq d_{max}) \\ d_1 (d > d_{max}) \end{cases}$$

where Diffd is the difference between the distortion degree of the excessively bright or excessively dark region and the reference distortion degree, d is the brightness of a certain region in the image, $d_1$ is a constant, $d_{min}$ is a preset brightness threshold of the excessively dark region, and $d_{max}$ is a preset brightness threshold of the excessively bright region, that is to say, if the regional brightness of a certain region is lower than $d_{min}$, the region is determined as an excessively dark region, and if the regional brightness of a certain region is higher than $d_{max}$, the region is determined as an excessively bright region.

Step S250: calculating a distortion tolerance of each macroblock constituting the image to be encoded according to the difference between the distortion degree of the feature region in the image to be encoded and the reference distortion degree.

In this embodiment, the image to be encoded is composed of many macroblocks. The distortion tolerance for each macroblock may be calculated according to the difference between the distortion degree of each feature region and the reference distortion degree calculated in the step S240.

The distortion tolerance for each macroblock may be calculated using the following formula.

$MyD$=reference distortion degree+Diff$a$+Diff$b$+Diff$c$+Diff$d$ where MyD represents the distortion tolerance of each macroblock.

Step S260: performing macroblock predictions on each macroblock in the image to be encoded based on the distortion tolerance of each macroblock constituting the image to be encoded to obtain an optimal (optimum) macroblock prediction mode.

In this embodiment, the macroblocks may be predicted using the following formula:

$D_1 = D_0 - (X*MyD+Y)$ where $D_1$ is an updated distortion value, $D_0$ is a distortion value which has not been updated, and X and Y are constants which are determined empirically.

The calculated distortion value $D_1$ is substituted into a current standard rate distortion function:

$J = D_1 + \lambda * R$ where J is a rate distortion cost, $\lambda$ is a Lagrangian parameter, and R is an encoding bit rate.

In the encoding process, the optimal prediction mode is obtained by traversal of the prediction modes of the macroblocks in the image to be encoded and comparing the rate distortion costs J, wherein the optimal prediction mode is used for encoding. During the macroblock prediction, the type of each macroblock is adjusted to minimize the bit rate after the encoding. In this embodiment, if $D_1$ is a negative number, an image to be encoded which is a P-frame may be encoded directly in the SKIP mode; if $D_1$ is a negative number, an image to be encoded which is an I-frame may be encoded in a selected intra-prediction mode having the smallest bit rate. If $D_1$ is not a negative number, a prediction method with the minimum rate distortion cost J may be directly selected for encoding. The bit rate can be reduced in macroblock predictions in the above manner.

In this embodiment, the bit rate control method may further include, before step S260, a step of: calculating a proportion of a motion region of the image to be encoded in the entire image to be encoded, and optimizing a quality factor according to the proportion.

The quality factor may be optimized using the following formula.

$$QP = \begin{cases} QP_{min} (b \leq b_{min}) \\ QP_{min} + (QP_{max} - QP_{min}) * \dfrac{b}{b_{min}} (b_{min} < b \leq b_{max}) \\ QP_{max} (b > b_{max}) \end{cases}$$

where QP is the quality factor of the motion region, $QP_{min}$ is a preset minimum value of the quality factor of the motion region, $QP_{max}$ is a preset maximum value of the quality factor of the motion region, b is the proportion of the motion region in the picture, $b_{min}$ is the preset lowest proportion of the motion region in the picture, and $b_{max}$ is the preset highest proportion of the motion region in the picture.

The above QP is set in this manner mainly because of the special nature of the surveillance scenes, which mainly includes the followings:

When the motion region is present in a relatively large proportion, even the motion region has a larger QP, the object can be seen clearly. In this case, it is no longer necessary to reduce the QP to guarantee the details because the object itself is relatively large. When the motion region is present in a relatively small proportion, the object will not be seen clearly even if the QP of the motion region is decreased. In this case, the main reason is pixel loss. Therefore, it is necessary to set a $QP_{min}$ to ensure no waste of the bit rate. If the QP is between $QP_{min}$ and $QP_{max}$, the change in QP of the region of interest may be controlled based on the change in proportion.

In this embodiment, the image to be encoded, in the optimal macroblock prediction mode obtained after the quality factor is optimized in the step S260, is encoded to control the bit rate of the image to be encoded.

Step S270: encoding the image to be encoded corresponding to the optimal macroblock prediction mode to complete the control of the bit rate of the image to be encoded.

After the optimal macroblock prediction mode is obtained, the bit rate control can be achieved by encoding the image to be encoded in this mode.

Figure 3:
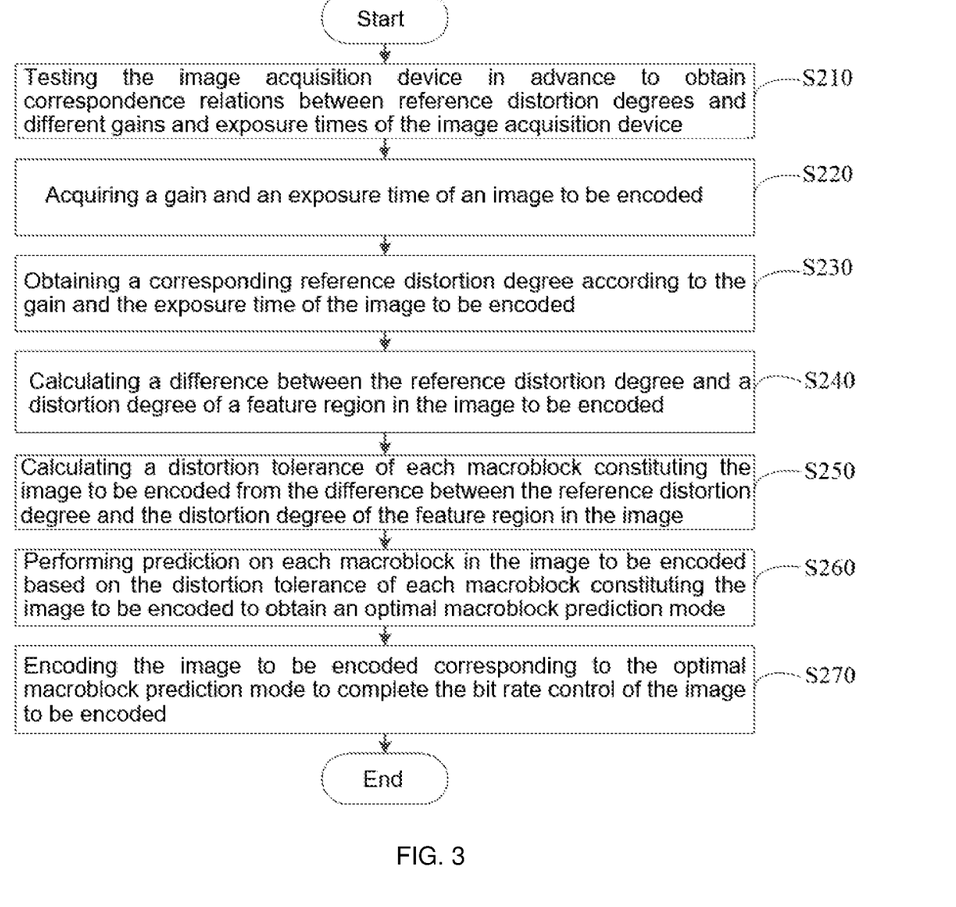
FIG. 3 is another schematic flowchart of the bit rate control method according to the first embodiment of the present disclosure.

Referring to FIG. 3, in this embodiment, the bit rate control method may further include step S210.

Step S210: testing the image acquisition device 100 in advance to obtain and store the correspondence relations between reference distortion degrees and different gains as well as different exposure times of the image acquisition device 100.

The different gains of the image acquisition device 100 are tested to roughly divide the gains into a noise-free gain section, a gain section with slight noise, and a gain section with severe noise.

In this embodiment, the test may be performed in the following manner. Evidently, it should be understood that the following manner is merely given as an example for the convenience of description, and should not be considered as specifically limiting the solutions of the present disclosure.

A test scene is selected. For instance, the image acquisition device is registered (aligned) with a colorchecker and fixed at a certain sharpness, the exposure time is also fixed, and a constant light source is given. In an implementation of this embodiment, the time-domain noise evaluation value may be calculated using the following formula.

Noise Evaluation Value=$\Sigma |F2(x,y)-F1(x,y)|$;

where $F2(x,y)$ is the current image frame, and $F1(x,y)$ is the previous image frame, where $(x,y)$ represents the coordinate of a pixel.

It can be understood that, in other implementations of this embodiment, the noise evaluation value may also be obtained in other methods, such as the square of the difference between image frames.

The noise evaluation value at each light intensity is recorded by changing the light intensity of the light source, and at the same time the gain value corresponding to the image acquisition device 100 is also recorded when the light irradiation is changed. The specific test may be performed as follows.

First, the exposure time is fixed, the light sources with different brightness are used in a traversal manner, and the gains and noise evaluation values are recorded. Then the exposure time is changed, and the above process is repeated until traversal of all exposure times is completed. The correspondence relations between different gains, different exposure times, and noise evaluation values are established. In this embodiment, the above correspondence relations may be optionally saved in a table for subsequent use. In the above, the corresponding reference distortion degrees are obtained according to the noise evaluation values.

Secondly, a picture under the automatic gain and automatic exposure is observed by the human eyes. Three intervals A, B, and C of the noise evaluation values are selected by changing light irradiation, which are also corresponding to the three gain sections a, b, and c, or may, of course, be corresponding to the exposure time sections. Here, the gain section is selected be explored. Since the image capturing sensor in each image acquisition device 100 has different light sensitivity, the gain sections obtained from the test will also be different, and it is sufficient to ensure that the three intervals A, B, and C coincide with the subjective perception as far as possible. It is experimentally found that the noise-free gain section scene has a relatively high brightness. At this time, the allowed distortion is often not too large, and the details are guaranteed. In the case of relatively large noise, the ambient illumination is often relatively low. In this case, larger distortion may be subjectively allowed. At this time, the bit rate can be provided more concentratedly to the regions in which quality should be ensured. Noisy scenes and noise-free complex scenes can be effectively distinguished with high reliability by establishing the correspondence relations between the reference distortion degrees and different gains and different exposure times of the image acquisition device 100 using the above steps. It can be seen from the above test that the bit rate can be saved (economized) effectively under a certain distortion degree. The distortion tolerance is related to the gain. Similarly, the exposure time also has such characteristics. The exposure time will be longer under weak light irradiation, and will be shorter otherwise.

Second Embodiment

Figure 4:
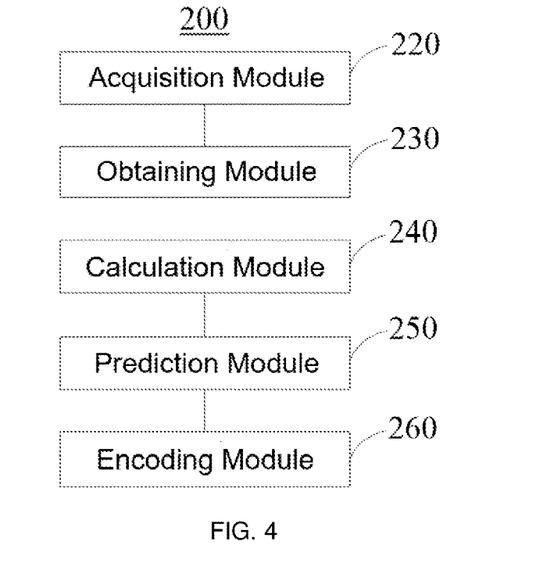
FIG. 4 is a schematic block diagram of a bit rate control apparatus according to a second embodiment of the present disclosure.

The second embodiment of the present disclosure provides a schematic block diagram of a bit rate control apparatus 200 shown in FIG. 1. Referring to FIG. 4, in the embodiment of the present disclosure, the bit rate control apparatus 200 is applicable to an image acquisition device 100. The correspondence relations between reference distortion degrees and different gains and different exposure times of the image acquisition device 100 are pre-stored in the image acquisition device 100. The bit rate control apparatus 200 may include an acquisition module 220, an obtaining module 230, a calculation module 240, a prediction module 250, and an encoding module 260.

The acquisition module 220 is configured to acquire a gain and an exposure time of an image to be encoded.

In this embodiment, the acquisition module 220 is configured to execute the step S220 in FIG. 2. Reference may be made to the step S220 for a detailed description of the acquisition module 220.

The obtaining module 230 is configured to obtain a corresponding reference distortion degree according to the gain and the exposure time of the image to be encoded.

The manner in which the obtaining module 230 obtains a reference distortion degree corresponding to the image to be encoded at the corresponding gain and exposure time includes:

searching, according to the obtained gain and exposure time of the image to be encoded, the prestored correspondence relations between reference distortion degrees and different gains and different exposure times of the image acquisition device 100, for a reference distortion degree of the image to be encoded.

In this embodiment, the obtaining module 230 is configured to execute the step S230 in FIG. 2. Reference may be made to the step S230 for a detailed description of the obtaining module 230.

The calculation module 240 is configured to calculate a difference between the reference distortion degree and a distortion degree of a feature region in the image to be encoded, wherein the feature region includes a region of interest, a motion region, a complexity region, or an excessively bright or dark region.

The calculation module 240 is further configured to calculate a distortion tolerance of each macroblock constituting the image to be encoded according to the difference between the reference distortion degree and the distortion degree of the feature region in the image to be encoded.

In this embodiment, the calculation module 240 is configured to execute the steps S240 to S250 in FIG. 2. Reference may be made to the steps S240 and S250 for a detailed description of the calculation module 240.

The prediction module 250 is configured to perform macroblock prediction on each macroblock in the image to be encoded based on the distortion tolerance of each macroblock constituting the image to be encoded to obtain an optimal macroblock prediction mode.

In this embodiment, the prediction module 250 is configured to execute the step S260 in FIG. 2. Reference may be made to the step S260 for a detailed description of the prediction module 250.

The encoding module 260 is configured to encode the image to be encoded corresponding to the optimal macroblock prediction mode to complete a bit rate control of the image to be encoded.

Figure 5:
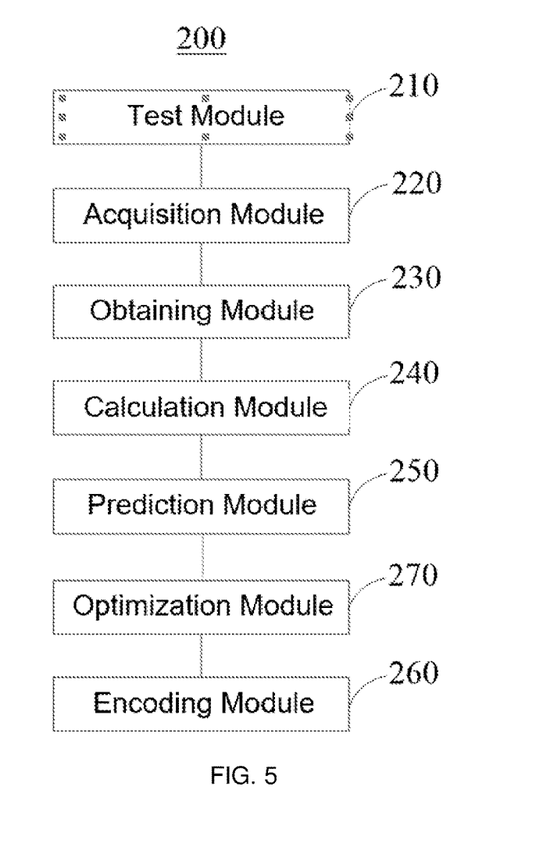
FIG. 5 is another schematic block diagram of the bit rate control apparatus according to the second embodiment of the present disclosure.

Referring to FIG. 5, in this embodiment, the bit rate control apparatus 200 further includes an optimization module 270.

The optimization module 270 is configured to calculate a proportion of a motion region of the image to be encoded in the entire image to be encoded, and optimize a quality factor of the image to be encoded according to the proportion.

The manner in which the encoding module 260 encodes the image to be encoded corresponding to the optimal macroblock prediction mode includes:

encoding the image to be encoded in the optimal macroblock prediction mode, with the image being obtained after the quality factor is optimized, so as to control the bit rate of the image to be encoded.

In this embodiment, the encoding module 260 is configured to execute the step S270 in FIG. 2. Reference may be made to the step S270 for a detailed description of the encoding module 260.

Refer to FIG. 5 again. In this embodiment, the bit rate control apparatus 200 further includes a test module 210.

The test module 210 is configured to test the image acquisition device 100 in advance to obtain and save the correspondence relations between reference distortion degrees and different gains as well as different exposure times of the image acquisition device 100.

In this embodiment, the test module 210 is configured to execute the step S210 in FIG. 3. Reference may be made to the step S210 for a detailed description of the test module 210.

When implemented in the form of a software functional module and sold or used as an independent product, the functions may be stored in a computer-readable storage medium. Based on such understanding, the technical solutions of the present disclosure, or the part thereof contributing to the prior art, or a part of the technical solutions may be embodied in the form of a software product. The computer software product is stored in a storage medium, and includes a number of instructions for causing a computer device (which may be a personal computer, a server, a network device, or the like) to execute all or some of the steps of the methods described in the various embodiments of the present disclosure. The preceding storage medium includes any medium that can store program codes, such as a USB flash disk, a mobile hard disk, a read-only memory (ROM), a random access memory (RAM), a magnetic disk, or an optical disk.

In summary, the embodiments of the present disclosure provide a bit rate control method and apparatus, an image acquisition device, and a readable storage medium, wherein the method includes: acquiring a gain and an exposure time of an image to be encoded by an image processing module of the image acquisition device; obtaining a reference distortion degree of the image to be encoded at the corresponding gain and exposure time; calculating a difference between the reference distortion degree and a distortion degree of a feature region in the image to be encoded, the feature region including a region of interest, a motion region, a complexity region, and an excessively bright or dark region; calculating a distortion tolerance of each of macroblock constituting the image to be encoded according to the difference between the reference distortion degree and the distortion degree of the feature region in the image to be encoded; performing prediction on each macroblock in the image to be encoded to obtain an optimal macroblock prediction mode; encoding the image to be encoded corresponding to the optimal macroblock prediction mode to complete a bit rate control of the image to be encoded. The method can achieve bit rate control by the cooperation of image processing and encoding while ensuring that the encoded image provides a good subjective representation. In the process of encoding an image to be encoded, noise in the image can be effectively distinguished.

The above description is merely illustrative of some embodiments of the present disclosure and is not intended to limit the present disclosure. It will be understood by those skilled in the art that various modifications and variations can be made to the present disclosure. Any modifications, equivalent alternatives, improvements and so on made within the spirit and principle of the present disclosure are to be included in the scope of protection of the present disclosure.

INDUSTRIAL APPLICABILITY

The present disclosure provides a bit rate control method and apparatus, an image acquisition device, and a readable storage device, which can achieve bit rate control by the cooperation of image processing and encoding while ensuring that the encoded image provides a good subjective representation.

What is claimed is:

1. A bit rate control method, which is applicable to an image acquisition device in which correspondence relations between reference distortion degrees and different gains as well as different exposure time of the image acquisition device are pre-stored, the method comprising following steps:

acquiring a gain and an exposure time of an image to be encoded;

obtaining a corresponding reference distortion degree according to the gain and the exposure time of the image to be encoded;

calculating a difference between the reference distortion degree and a distortion degree of a feature region in the image to be encoded;

calculating a distortion tolerance of each macroblock constituting the image to be encoded according to the difference between the reference distortion degree and the distortion degree of the feature region in the image to be encoded;

performing prediction on each macroblock in the image to be encoded based on the distortion tolerance of each macroblock constituting the image to be encoded to obtain an optimal macroblock prediction mode; and encoding the image to be encoded corresponding to the optimal macroblock prediction mode to complete a bit rate control of the image to be encoded.

2. The method according to claim 1, further comprising:

testing the image acquisition device in advance to obtain and store the correspondence relations between the reference distortion degrees and different gains as well as different exposure times of the image acquisition device.

3. The method according to claim 1, wherein a step of testing the image acquisition device in advance to obtain and store the correspondence relations between the reference distortion degrees and different gains as well as different exposure times of the image acquisition device comprises:

changing the exposure time and light source brightness of the image acquisition device, and recording a gain and a noise evaluation value under each corresponding exposure time and light source brightness;

obtaining a corresponding reference distortion degree according to the noise evaluation value; and establishing the correspondence relations between the reference distortion degrees and different gains as well as different exposure times.

4. The method according to claim 1, further comprising: calculating a proportion of a motion region of the image to be encoded in the entire image to be encoded, and optimizing a quality factor of the image to be encoded according to the proportion of the motion region of the image to be encoded in the entire image to be encoded;

wherein the step of encoding the image to be encoded comprises:
encoding the image to be encoded in the optimal macroblock prediction mode obtained after the quality factor is optimized, so as to control a bit rate of the image to be encoded.

5. The method according to claim 4, wherein the feature region comprises: a region of interest, a motion region, a complexity region, or an excessively bright or dark region.

6. The method according to claim 5, wherein the quality factor is optimized by using following formula:

$$QP = \begin{cases} QP_{min}(b \leq b_{min}) \\ QP_{min} + (QP_{max} - QP_{min}) * \dfrac{b}{b_{min}}(b_{min} < b \leq b_{max}) \\ QP_{max}(b > b_{max}) \end{cases}$$

where QP is the quality factor of the motion region, $QP_{min}$ is a preset minimum value of the quality factor of the motion region, $QP_{max}$ is a preset maximum value of the quality factor of the motion region, b is the proportion of the motion region in a picture, $b_{min}$ is a preset lowest proportion of the motion region in the picture, and $b_{max}$ is a preset highest proportion of the motion region in the picture; and wherein the step of calculating a distortion tolerance of each macroblock constituting the image to be encoded according to the difference between the reference distortion degree and the distortion degree of the feature region in the image to be encoded comprises:
obtaining a sum of the reference distortion degree, a difference between the distortion degree of the region of interest and the reference distortion degree, a difference between the distortion degree of the motion region and the reference distortion degree, a difference between the distortion degree of the complexity region and the reference distortion degree, and a difference between the distortion degrees of the excessively bright or dark region in the image to be encoded and the reference distortion degree, and using the obtained sum as the distortion tolerance of the current macroblock.

7. The method according to claim 5, wherein the difference between the distortion degree of the region of interest and the reference distortion degree is determined using following formula:

$$Diffa = \begin{cases} Diffa_{min}(a \leq a_{min}) \\ Diffa_{min} + (Diffa_{max} - Diffa_{min}) * \dfrac{a}{a_{min}}(a_{min} < a \leq a_{max}) \\ Diffa_{max}(a > a_{max}) \end{cases}$$

where Diffa is a difference between the distortion degree in the region of interest and the reference distortion degree, $Diffa_{min}$ is a preset minimum distortion degree of the region of interest, $Diffa_{max}$ is a preset maximum distortion degree of the region of interest, a is a proportion of the region of interest in a picture, $a_{min}$ is a preset lowest proportion of the region of interest in the picture, and $a_{max}$ is a preset highest proportion of the region of interest in the picture.

8. The method according to claim 5, wherein the difference between the distortion degree of the motion region and the reference distortion degree is determined using following formula:

$$Diffb = \begin{cases} Diffb_{min}(b \leq b_{min}) \\ Diffb_{min} + (Diffb_{max} - Diffb_{min}) * \dfrac{b}{b_{min}}(b_{min} < b \leq b_{max}) \\ Diffb_{max}(b > b_{max}) \end{cases}$$

where Diffb is a difference between the distortion degree in the motion region and the reference distortion degree, $Diffb_{min}$ is a preset minimum distortion degree of the motion region, $Diffb_{max}$ is a preset maximum distortion degree of the motion region, b is a proportion of the motion region in a picture, $b_{min}$ is a preset lowest proportion of the motion region in the picture, and $b_{max}$ is a preset highest proportion of the motion region in the picture.

9. The method according to claim 5, wherein the difference between the distortion degree of the complexity region and the reference distortion degree is determined using following formula:

$$Diffc = \begin{cases} Diffc_{min}(c \leq c_{min}) \\ Diffc_{min} + (Diffc_{max} - Diffc_{min}) * \dfrac{c}{c_{min}}(c_{min} < c \leq c_{max}) \\ Diffc_{max}(c > c_{max}) \end{cases}$$

where Diffc is a difference between the distortion degree in the complexity region and the reference distortion degree, $Diffc_{min}$ is a preset minimum distortion degree of the complexity region, $Diffc_{max}$ is a preset maximum distortion degree of the complexity region, c is a proportion of the complexity region in a picture, $c_{min}$ is a preset lowest proportion of the complexity region in the picture, and $c_{max}$ is a preset highest proportion of the complexity region in the picture.

10. The method according to claim 1, wherein the step of performing prediction on each macroblock of the image to be encoded to obtain an optimal macroblock prediction mode comprises:
performing traversal of modes of prediction of the macroblock; and
comparing rate distortion cost values corresponding to the respective prediction modes, and selecting the optimal prediction mode; and
wherein the macroblock is predicted using following formula:

$$D_1 = D_0 - (X*MyD + Y)$$

where $D_1$ is an updated distortion value, $D_0$ is a distortion value which has not been updated, X and Y are preset constants, and MyD represents a distortion tolerance of each macroblock; and
calculated distortion value $D_1$ is substituted into a current standard rate distortion function:

$$J = D_1 + \lambda * R$$

where J is a rate distortion cost, λ is a Lagrangian parameter, and R is an encoding bit rate.

11. A bit rate control apparatus, which is applicable to an image acquisition device in which correspondence relations between reference distortion degrees and different gains as well as different exposure times of the image acquisition device are pre-stored, the apparatus comprising:
   an acquisition module configured to acquire a gain and an exposure time of an image to be encoded;
   an obtaining module configured to obtain a corresponding reference distortion degree according to the gain and the exposure time of the image to be encoded;
   a calculation module configured to calculate a difference between the reference distortion degree and a distortion degree of a feature region in the image to be encoded;
   wherein the calculation module is further configured to calculate a distortion tolerance of each macroblock constituting the image to be encoded according to the difference between the reference distortion degree and the distortion degree of the feature region in the image to be encoded;
   a prediction module configured to perform prediction on each macroblock in the image to be encoded based on the distortion tolerance of each macroblock constituting the image to be encoded to obtain an optimal macroblock prediction mode; and
   an encoding module configured to encode the image to be encoded corresponding to the optimal macroblock prediction mode to complete a bit rate control of the image to be encoded.

12. The bit rate control apparatus according to claim 11, wherein a method of testing the image acquisition device in advance to obtain and store the correspondence relations between reference distortion degrees and different gains as well as different exposure times of the image acquisition device comprises:
   changing the exposure time and light source brightness of the image acquisition device, and recording a gain and a noise evaluation value under each corresponding exposure time and light source brightness;
   obtaining a corresponding reference distortion degree according to the noise evaluation value;
   establishing the correspondence relations between the reference distortion degrees and different gains as well as different exposure times.

13. The bit rate control apparatus according to claim 11, further comprising a quality factor optimization module configured to calculate a proportion of a motion region of the image to be encoded in the entire image to be encoded, and optimize a quality factor of the image to be encoded according to the proportion of the motion region of the image to be encoded in the entire image to be encoded;
   wherein a method of encoding the image to be encoded by the encoding module comprises:
   encoding the image to be encoded in the optimal macroblock prediction mode obtained after the quality factor is optimized, so as to control the bit rate of the image to be encoded.

14. The bit rate control apparatus according to claim 13, wherein the feature region comprises: a region of interest, a motion region, a complexity region, or an excessively bright or dark region; and
   wherein the quality factor is optimized by the quality factor optimization module using following formula:

$$QP = \begin{cases} QP_{min} & (b \leq b_{min}) \\ QP_{min} + (QP_{max} - QP_{min}) * \dfrac{b}{b_{min}} & (b_{min} < b \leq b_{max}) \\ QP_{max} & (b > b_{max}) \end{cases}$$

where QP is the quality factor of the motion region, $QP_{min}$ is a preset minimum value of the quality factor of the motion region, $QP_{max}$ is a preset maximum value of the quality factor of the motion region, b is a proportion of the motion region in a picture, $b_{min}$ is a preset lowest proportion of the motion region in the picture, and $b_{max}$ is a preset highest proportion of the motion region in the picture.

15. The bit rate control apparatus according to claim 14, wherein a method of calculating, by the calculation module, a distortion tolerance of each macroblock constituting the image to be encoded according to the difference between the reference distortion degree and the distortion degree of the feature region in the image to be encoded comprises:
   obtaining a sum of the reference distortion degree, a difference between the distortion degree of the region of interest and the reference distortion degree, a difference between the distortion degree of the motion region and the reference distortion degree, a difference between the distortion degree of the complexity region and the reference distortion degree, and a difference between the degrees of distortion of the excessively bright or dark region in the image to be encoded and the reference distortion degree, and using the obtained sum as the distortion tolerance of the current macroblock.

16. The bit rate control apparatus according to claim 14, wherein the difference between the reference distortion degree and the distortion degree of the region of interest is determined using following formula:

$$Diffa = \begin{cases} Diffa_{min} & (a \leq a_{min}) \\ Diffa_{min} + (Diffa_{max} - Diffa_{min}) * \dfrac{a}{a_{min}} & (a_{min} < a \leq a_{max}) \\ Diffa_{max} & (a > a_{max}) \end{cases}$$

where Diffa is a difference between the distortion degree in the region of interest and the reference distortion degree, $Diffa_{min}$ is a preset minimum distortion degree of the region of interest, $Diffa_{max}$ is a preset maximum distortion degree of the region of interest, a is a proportion of the region of interest in the picture, $a_{min}$ is a preset lowest proportion of the region of interest in the picture, and $a_{max}$ is a preset highest proportion of the region of interest in the picture.

17. The bit rate control apparatus according to claim 14, wherein the difference between the distortion degree of the motion region and the reference distortion degree is determined using following formula:

$$Diffb = \begin{cases} Diffb_{min} & (b \leq b_{min}) \\ Diffb_{min} + (Diffb_{max} - Diffb_{min}) * \dfrac{b}{b_{min}} & (b_{min} < b \leq b_{max}) \\ Diffb_{max} & (b > b_{max}) \end{cases}$$

where Diffb is a difference between the reference distortion degree and the distortion degree in the motion region, $Diffb_{min}$ is a preset minimum distortion degree of the motion region, $Diffb_{max}$ is a preset maximum distortion degree of the motion region, b is a proportion of the motion region in the picture, $b_{min}$ is a preset lowest proportion of the motion region in the picture, and $b_{max}$ is a preset highest proportion of the motion region in the picture.

18. The bit rate control apparatus according to claim 14, wherein the difference between the distortion degree of the complexity region and the reference distortion degree is determined using following formula:

$$Diffc = \begin{cases} Diffc_{min} & (c \leq c_{min}) \\ Diffc_{min} + (Diffc_{max} - Diffc_{min}) * \dfrac{c}{c_{min}} & (c_{min} < c \leq c_{max}) \\ Diffc_{max} & (c > c_{max}) \end{cases}$$

where Diffc is the difference between the reference distortion degree and the distortion degree in the complexity region, $Diffc_{min}$ is a preset minimum distortion degree of the complexity region, $Diffc_{max}$ is a preset maximum distortion degree of the complexity region, c is a proportion of the complexity region in the picture, $c_{min}$ is a preset lowest proportion of the complexity region in the picture, and $c_{max}$ is a preset highest proportion of the complexity region in the picture.

19. The bit rate control apparatus according to claim 11, wherein a method of performing prediction on a macroblock of the image to be encoded to obtain an optimal macroblock prediction mode by the prediction module comprises:
  performing traversal of modes of prediction of the macroblock;
  comparing rate distortion cost values corresponding to the respective prediction modes, and selecting the optimal prediction mode; and
  wherein the macroblock is predicted using following formula:

$$D_1 = D_0 - (X*MyD + Y)$$

where $D_1$ is an updated distortion value, $D_0$ is a distortion value which has not been updated, X and Y are preset constants, and MyD represents a distortion tolerance of each macroblock;
  calculated distortion value $D_1$ is substituted into a current standard rate distortion function:

$$J = D_1 + \lambda * R$$

where J is a rate distortion cost, $\lambda$ is a Lagrangian parameter, and R is an encoding bit rate.

20. An image acquisition device comprising a processor and a non-volatile memory storing a number of computer instructions, wherein the image acquisition device is configured to execute the bit rate control method according to claim 1 when the computer instructions are executed by the processor.

* * * * *